(12) United States Patent
Nelson

(10) Patent No.: US 10,101,537 B2
(45) Date of Patent: Oct. 16, 2018

(54) HIGH-SPEED DATA CONNECTOR

(71) Applicant: FINISAR CORPORATION, Sunnyvale, CA (US)

(72) Inventor: Stephen T. Nelson, Santa Clara, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/383,786

(22) Filed: Dec. 19, 2016

(65) Prior Publication Data

US 2017/0179627 A1   Jun. 22, 2017

Related U.S. Application Data

(60) Provisional application No. 62/268,681, filed on Dec. 17, 2015.

(51) Int. Cl.
*G02B 6/38* (2006.01)
*H04B 10/40* (2013.01)
*H01R 13/6471* (2011.01)

(52) U.S. Cl.
CPC ....... *G02B 6/3807* (2013.01); *H01R 13/6471* (2013.01); *H04B 10/40* (2013.01)

(58) Field of Classification Search
CPC ...... G02B 6/36; G02B 6/3807; G02B 6/4201; G02B 6/4246; G02B 6/4292; H05K 1/117; H01R 23/6873; H01R 12/728; H01R 13/646; H01R 13/665; H01R 13/6471
USPC .................................. 439/101, 108, 497, 660
See application file for complete search history.

(56) References Cited

U.S. PATENT DOCUMENTS

| | | | | |
|---|---|---|---|---|
| 5,051,099 A | * | 9/1991 | Pickles | H01R 12/721 439/108 |
| 7,090,509 B1 | * | 8/2006 | Gilliland | G02B 6/4246 385/92 |
| 7,401,985 B2 | * | 7/2008 | Aronson | G02B 6/4416 385/89 |
| 7,453,338 B2 | * | 11/2008 | Aronson | H01R 23/688 333/260 |

(Continued)

OTHER PUBLICATIONS

International Search Report and Written Opinion dated Apr. 19, 2017 in related PCT Application No. PCT/US2016/067627 (10 pages).

*Primary Examiner* — Edwin A. Leon
*Assistant Examiner* — Oscar Jimenez
(74) *Attorney, Agent, or Firm* — Maschoff Brennan

(57) ABSTRACT

A transceiver connector may include a bottomside connector. The bottomside connector may include a first ground pin adjacent to an edge of the bottomside connector, a first high-speed differential input pin adjacent to the first ground pin, a second high-speed differential input pin adjacent to the first high-speed differential input pin, a second ground pin adjacent to the second high-speed differential input pin, a serial interface data line pin adjacent to the second ground pin, a serial interface clock pin adjacent to the serial interface data line pin, a third ground pin adjacent to the serial interface clock pin, a first high-speed differential output pin adjacent to the third ground pin, a second high-speed differential output pin adjacent to the first high-speed differential output pin, and a fourth ground pin adjacent to the second high-speed differential output pin.

20 Claims, 5 Drawing Sheets

(56) References Cited

U.S. PATENT DOCUMENTS

| | | | |
|---|---|---|---|
| 2004/0159776 A1 | 8/2004 | Richard et al. | |
| 2005/0063707 A1* | 3/2005 | Imai | H04L 25/14 |
| | | | 398/141 |
| 2006/0029332 A1* | 2/2006 | Chiu | G02B 6/3893 |
| | | | 385/53 |
| 2007/0230878 A1 | 10/2007 | Nakazawa et al. | |
| 2007/0232091 A1* | 10/2007 | Hong | H05K 1/117 |
| | | | 439/66 |
| 2007/0237472 A1* | 10/2007 | Aronson | G02B 6/4292 |
| | | | 385/101 |
| 2008/0145060 A1* | 6/2008 | Nelson | G02B 6/4201 |
| | | | 398/135 |
| 2008/0212972 A1* | 9/2008 | Nelson | G02B 6/4201 |
| | | | 398/135 |
| 2011/0273339 A1* | 11/2011 | Hornung | H01Q 1/1207 |
| | | | 343/702 |
| 2012/0129396 A1* | 5/2012 | Wang | H01R 12/515 |
| | | | 439/607.01 |
| 2013/0001410 A1* | 1/2013 | Zhao | H05K 1/0243 |
| | | | 250/227.11 |
| 2013/0045638 A1* | 2/2013 | Gui | H01R 13/6471 |
| | | | 439/660 |
| 2013/0115826 A1* | 5/2013 | Sloey | H01R 13/405 |
| | | | 439/690 |
| 2014/0349496 A1* | 11/2014 | Zhu | H05K 1/0219 |
| | | | 439/108 |
| 2015/0086211 A1 | 3/2015 | Coffey et al. | |

* cited by examiner

HIGH-SPEED DATA CONNECTOR

BACKGROUND

Field of the Invention

Embodiments described herein relate generally to high-speed data connectors.

Related Technology

Communication modules, such as electronic or optoelectronic transceivers or transponder modules, are increasingly used in electronic and optoelectronic communication. Conventional communication modules generally include host connectors for communicatively connecting the communication modules to host devices. Optoelectronic transceivers conventionally include the host connector in the form of an edge connector including an arrangement of exposed, conductive surfaces (or "pins"). The pins may be located on two opposite surfaces of the edge connector. Each of the pins of the edge connector may be positioned to form a conductive connection with a corresponding conductive element of the host device when the transceiver is connected to (or "plugged into") the host device.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below. This Summary is not intended to identify key features or essential characteristics of the claimed subject matter, nor is it intended to be used as an aid in determining the scope of the claimed subject matter.

Embodiments may include a transceiver connector having a bottomside connector. The bottomside connector may include a first ground pin adjacent to an edge of the bottomside connector, a first high-speed differential input pin adjacent to the first ground pin, a second high-speed differential input pin adjacent to the first high-speed differential input pin, a second ground pin adjacent to the second high-speed differential input pin, a serial interface data line pin adjacent to the second ground pin, a serial interface clock pin adjacent to the serial interface data line pin, a third ground pin adjacent to the serial interface clock pin, a first high-speed differential output pin adjacent to the third ground pin, a second high-speed differential output pin adjacent to the first high-speed differential output pin, and a fourth ground pin adjacent to the second high-speed differential output pin.

Further embodiments may include a transceiver connector having a bottomside connector. The bottomside connector may include a first ground pin adjacent to an edge of the bottomside connector, a first high-speed differential input pin adjacent to the first ground pin, a second high-speed differential input pin adjacent to the first high-speed differential input pin, a second ground pin adjacent to the second high-speed differential input pin, a serial interface data line pin adjacent to the second ground pin, a serial interface clock pin adjacent to the serial interface data line pin, a transceiver module detection pin adjacent to the serial interface clock pin, a third ground pin adjacent to the transceiver module detection pin, a first high-speed differential output pin adjacent to the third ground pin, a second high-speed differential output pin adjacent to the first high-speed differential output pin, and a fourth ground pin adjacent to the second high-speed differential output pin.

Additional embodiments may include a transceiver connector having a topside connector. The topside connector may include a low-speed interface pin adjacent to an edge of the topside connector, a first ground pin adjacent to the low-speed interface pin, a first high-speed differential output pin adjacent to the first ground pin, a second high-speed differential output pin adjacent to the first high-speed differential output pin, a second ground pin adjacent to the second high-speed differential output pin, a receiver power pin adjacent to the second ground pin, a transmitter power pin adjacent to the receiver power pin, a third ground pin adjacent to the transmitter power pin, a first high-speed differential input pin adjacent to the third ground pin, a second high-speed differential input pin adjacent to the first high-speed differential input pin, and a fourth ground pin adjacent to the second high-speed differential input pin.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. These drawings depict only example embodiments of the invention and are therefore not to be considered limiting of its scope. The invention will be described and explained with additional specificity and detail through the use of the accompanying drawings.

DESCRIPTION

Some embodiments include a connector with multiple pins arranged as described herein. The connector may be implemented in an enhanced small form-factor pluggable (SFP+) optoelectronic transceiver. Alternatively, the connector may be implemented in other forms of optoelectronic transceivers, communications transceivers, or other devices having some or all of the functionality described below. Some embodiments may improve signal integrity and may facilitate faster data transfer rates relative to conventional pin arrangements.

In particular, some embodiments may improve signal integrity and may facilitate faster data transfer rates relative to conventional SFP+ optoelectronic transceiver connector pin arrangements. Some embodiments may double the data flow into and out of a transceiver relative to conventional SFP+ transceivers. Alternately or additionally, embodiments may double the data flow into and out of the transceiver within a footprint associated with the SFP+ form factor without relying on an increase in the signaling speed of the data stream. Some embodiments may be used with 50-Gbps (50 G) or 100-Gbps (100 G) optical transceivers having a form factor similar to SFP+.

Thus, for example, embodiments may facilitate a 50-Gbps transceiver having an SFP+ form factor for use with a host device having electrical interface signaling rates limited to 25 Gbps. Similarly, embodiments may facilitate a 100-Gbps transceiver having an SFP+ form factor for use with a host device having electrical interface signaling rates limited to 50 Gbps, or the like.

In some embodiments, the transceiver may include two high-speed differential input data streams and two high-speed differential output data streams. Grounding structures may be included around both high-speed differential input data streams and both high-speed differential output data streams. The grounding structures included around each of the high-speed differential data streams may accommodate relatively high signal integrities.

Reference is made to the figures, which may include like structures having like reference designations. The drawings are diagrammatic and schematic representations of embodiments and are not limiting of the scope of the claimed subject matter. Furthermore, the drawings are not necessarily drawn to scale.

Figure 1A:
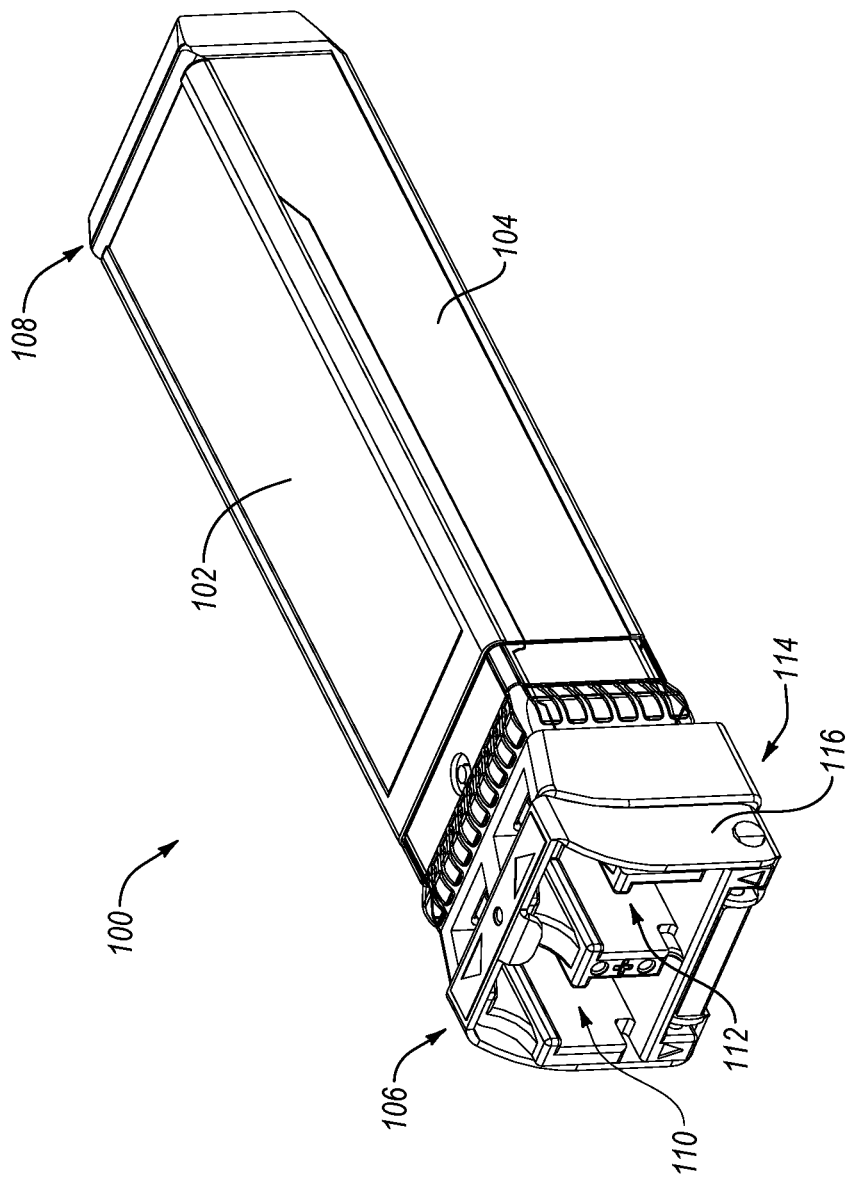
FIG. 1A illustrates a perspective view of an example transceiver.

FIG. 1A illustrates a perspective view of an example transceiver module generally designated as transceiver 100 in which a COL OSA may be implemented. The transceiver 100 can be an SFP+ optical transceiver. While described in some detail herein, the transceiver 100 is discussed by way of illustration, and not by way of restricting the scope of the claimed subject matter. For example, although the transceiver 100 can be an SFP+ optical transceiver, the principles of the embodiments can be analogously implemented in optoelectronic modules of other form factors such as small form-factor pluggable (SFP), small form-factor (SFF), XFP, XENPAK, and XPAK, or the like. Furthermore, communications modules and optoelectronic modules of other types and configurations, or having components that differ in some respects from those shown and described herein, can also benefit from the principles disclosed herein.

As shown in FIG. 1A, the transceiver 100 includes a body composed of a top shell 102 and a bottom shell 104. The bottom shell 104 defines a front end 106 and a back end 108 of the transceiver 100. Included on the front end 106 of the transceiver 100 are two fiber openings 110, 112 configured to receive connectors of an optical fiber. The two fiber openings 110, 112 include an output fiber opening 110 and an input fiber opening 112. The fiber openings 110, 112 define a portion of an interface portion 114 that is generally included on the front end 106 of the transceiver 100. The interface portion 114 can include structures to operably connect the transceiver 100 to optical fibers or optical fiber connectors such as, but not limited to, LC connectors.

Also disposed on the front end 106 of the transceiver 100 is a bail latch assembly 116 that enables the transceiver 100 to be removably secured in a host device. The body of the transceiver 100, including the top shell 102 and the bottom shell 104, can be formed of metal. The host device may include a cage in which the transceiver 100 is inserted and to which the transceiver is removably secured.

Figure 1B:
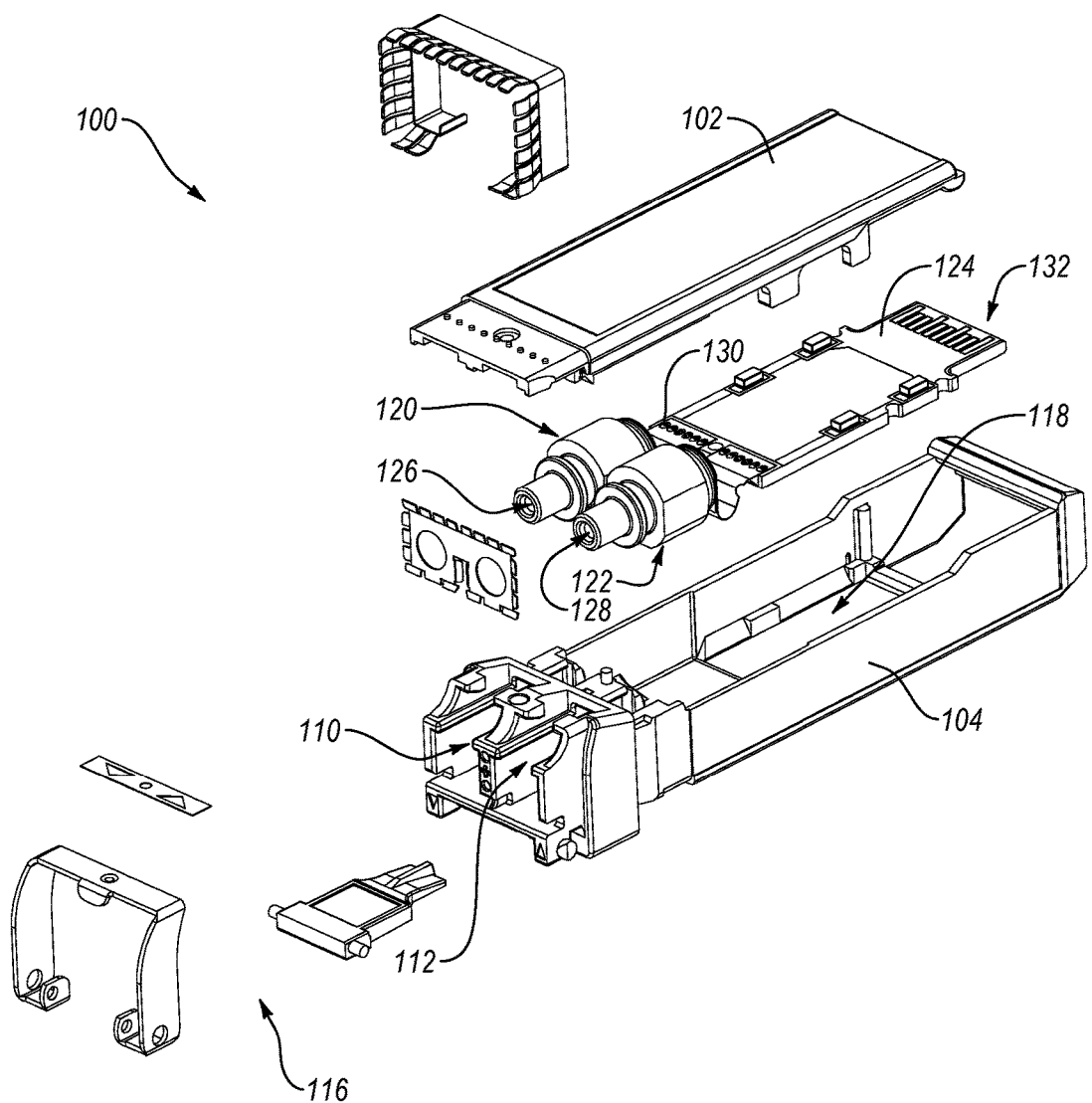
FIG. 1B illustrates an exploded perspective view of the transceiver of FIG. 1A.

FIG. 1B illustrates a partially exploded perspective view of the transceiver 100 of FIG. 1A. In FIG. 1B, the bottom shell 104 defines a cavity 118 in which a transmitter optical subassembly (TOSA) 120, a receiver optical subassembly (ROSA) 122, a printed circuit board (PCB) 124, and PCB electrical connectors 130 are included as internal components of the transceiver 100.

Each of the TOSA 120 and the ROSA 122 includes a fiber receiver 126 and 128, respectively, that extends into a respective one of the fiber openings 110, 112 so as to be positioned to mate with an optical fiber or a connector portion of the optical fiber when received within the fiber openings 110, 112. The TOSA 120 and the ROSA 122 can be electrically coupled to the PCB 124 via the PCB electric connectors 130. The PCB electric connectors 130 may include a leadframe connector or equivalent electrical contacts that allow the transmission of electrical signals between the PCB 124 and the TOSA 120 or ROSA 122.

During operation, the transceiver 100 can receive a data-carrying electrical signal from a host device for transmission as a data-carrying optical signal on to an optical fiber. The data-carrying electrical signal may be communicated to the transceiver 100 from the host device via an edge connector 132 conductively connected to a connector of the host device. The host device may be any computing system capable of communicating with the transceiver 100. The electrical signal can be provided to an optical transmitter, such as a laser disposed within the TOSA 120, which converts the electrical signal into a data-carrying optical signal for emission on to an optical fiber and transmission via an optical communication network, for instance. The optical transmitter can include an edge-emitting laser diode, a Fabry-Perot (FP) laser, a vertical cavity surface emitting laser (VCSEL), a distributed feedback (DFB) laser, or other suitable light source. Accordingly, the TOSA 120 can serve or include components that serve as an electro-optic transducer.

In addition, the transceiver 100 can receive a data-carrying optical signal from an optical fiber via the ROSA 122. The ROSA 122 can include an optical receiver, such as a PIN photodiode, an avalanche photodiode (APD), or other suitable receiver, which transforms the received optical signal into a data-carrying electrical signal. Accordingly, the ROSA 122 can serve or include components that serve as an optoelectric transducer. The resulting electrical signal can then be provided to the host device via the edge connector 132. The edge connector 132 may include a topside edge connector and a bottomside edge connector. The topside edge connector is located on the visible surface of the edge connector 132 and the bottomside edge connector is located on an opposite surface of the edge connector 132 that is not visible in the figure. The topside and bottomside edge connectors include multiple exposed, conductive surfaces (or "pins"). Each of the pins of the edge connector may be positioned to form a conductive connection with a corresponding conductive element of the host device when the transceiver is connected to (or "plugged into") the host device.

The pins of the transceivers may be positioned such that the sequence in which the pins of the transceiver make contact with (or "mate") and separate from (or "demate") the conductive elements of the host device may be controlled by varying the length of the pins. Thus, for example, relatively longer pins may establish relatively earlier contact as the transceiver is plugged into the host device and may maintain contact relatively later as the transceiver is unplugged from the host device. Controlling the contact sequence of the pins may accommodate hot plugging (also described as "hot swapping") of the transceiver into the host device. By way of example, ground pins may have a longest length (long pins), signal pins may have a shortest length (short pins), and power pins may have an intermediate length (intermediate-length pins).

Figure 2B:
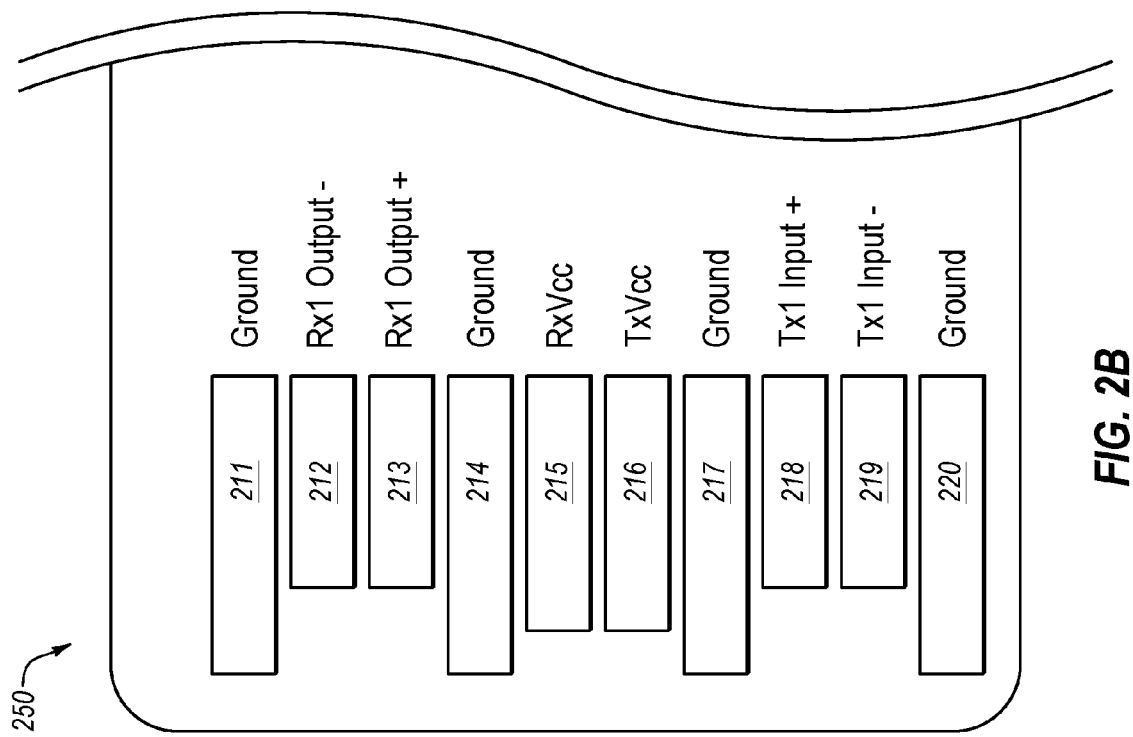
FIG. 2B illustrates an example topside edge connector.
Figure 2A:
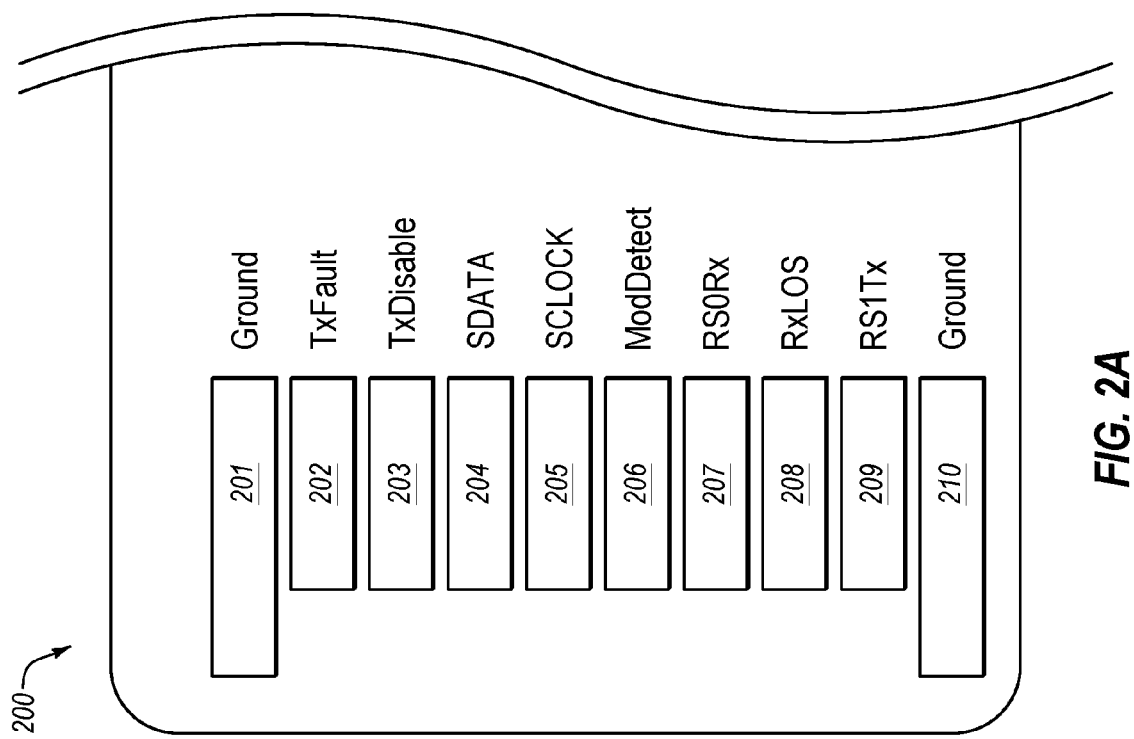
FIG. 2A illustrates an example bottomside edge connector.

FIG. 2A illustrates an example bottomside edge connector 200. The bottomside edge connector 200 may generally correspond to a bottomside of the conventional edge connector 132 of the transceiver 100 of FIG. 1B. For example, the bottomside edge connector 200 may correspond to the side of the edge connector 132 not visible in FIG. 1B.

The bottomside edge connector 200 includes a ground pin 201 and a ground pin 210. The ground pin 201 and the ground pin 210 are connected to a ground of the transceiver. Furthermore, the bottomside edge connector 200 includes a transmitter fault pin 202, which can be used to indicate that there is a fault in the transceiver. Additionally, the bottomside edge connector 200 includes a transmitter disable pin 203, which can be used to disable the transmitter output of the transceiver. The bottomside edge connector 200 also includes a serial interface data line pin 204 and a serial interface clock pin 205, through which a host device and the transceiver can communicate. Additionally, the bottomside edge connector 200 includes a module detect pin 206, which can be used by the host device to detect the transceiver. Furthermore, the bottomside edge connector 200 includes a receive rate speed control pin 207 and a transmit rate speed control pin 209. The bottomside edge connector 200 also includes a loss of signal pin 208, which can be used to communicate a signal indicating that the transceiver has stopped receiving a signal.

The ground pin 201 and the ground pin 210 may be described herein as ground pins and are long pins. The transmitter fault pin 202, the transmitter disable pin 203, the serial interface data line pin 204, the serial interface clock pin 205, the module detect pin 206, the receive rate speed control pin 207, the loss of signal pin 208, and the transmit rate speed control pin 209 may be described herein as signal pins and are short pins.

FIG. 2B illustrates an example topside edge connector 250. The topside edge connector 250 may generally correspond to a topside of the conventional edge connector 132 of FIG. 1B. For example, the topside edge connector 250 may correspond to the side of the edge connector 132 visible in FIG. 1B.

The topside edge connector 250 includes a ground pin 211, a ground pin 214, a ground pin 217, and a ground pin 220, which are connected to a ground of the transceiver and have the same length as the ground pin 201 and ground pin 210 of the bottomside edge connector 200 of FIG. 2A. A receiver inverted data output pin 212 and a receiver data output pin 213 are located between the ground pin 211 and the ground pin 214. The receiver inverted data output pin 212 and the receiver data output pin 213 accommodate a high-speed differential output data stream. Similarly, a transmitter data input pin 218 and a transmitter inverted data input pin 219 are located between the ground pin 217 and the ground pin 220. The transmitter data input pin 218 and the transmitter inverted data input pin 219 accommodate a high-speed differential input data stream. The receiver inverted data output pin 212, the receiver data output pin 213, the transmitter data input pin 218 and the transmitter inverted data input pin 219 have lengths corresponding to the lengths of the non-ground pins of the bottomside edge connector 200 of FIG. 2A. The topside edge connector 250 further includes a receiver power supply pin 215 and a transmitter power supply pin 216 that provide power, respectively, to receiver circuitry and transmitter circuitry of the transceiver.

The ground pin 211, the ground pin 214, the ground pin 217, and the ground pin 220 may also be described herein as ground pins and are long pins. The receiver inverted data output pin 212, the receiver data output pin 213, the transmitter data input pin 218, and the transmitter inverted data input pin 219 may also be described herein as signal pins and are short pins. The receiver power supply pin 215 and the transmitter power supply pin 216 may be described herein as power pins and are intermediate-length pins.

Thus, conventional SFP+ transceiver includes one high-speed differential input and one high-speed differential output, both located on the topside connector. The bottomside connector of the conventional SFP+ transceiver may not be configured to input or output high-speed signals. As a result, signal integrity of high-speed signals communicated via the bottomside connector of conventional SFP+ transceivers may be compromised. Thus, the data flow into and out of the transceiver may be limited.

Figure 3:
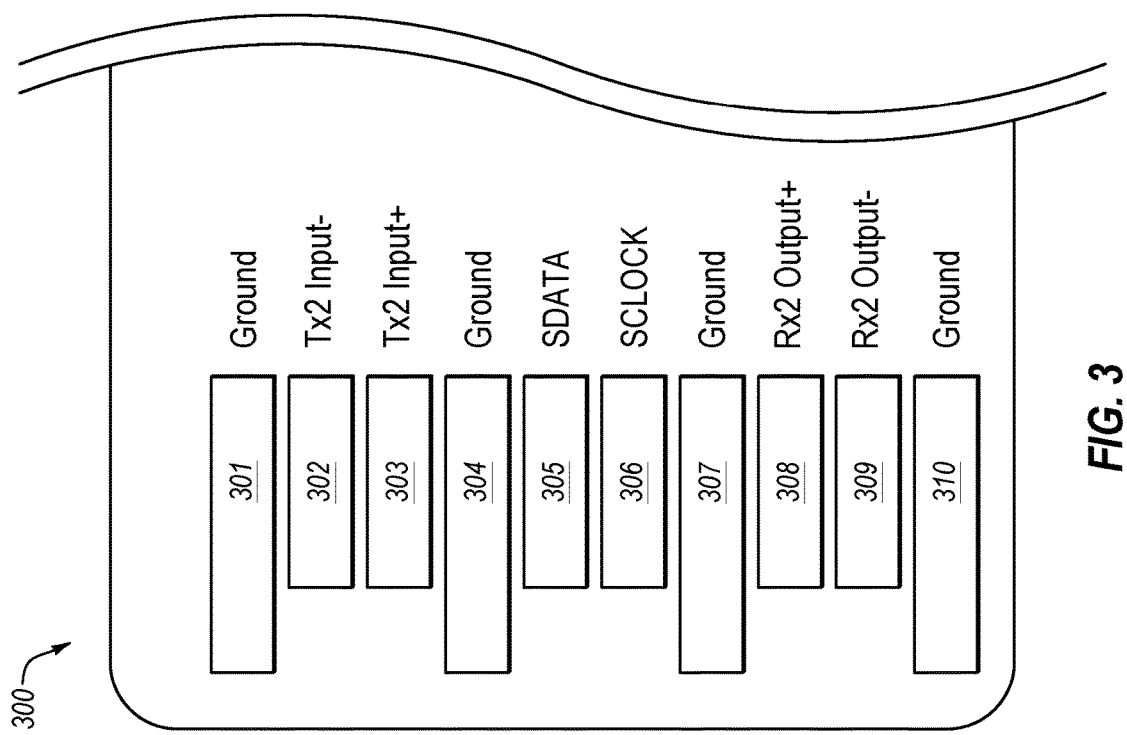
FIG. 3 illustrates another example bottomside edge connector.

FIG. 3 illustrates another example bottomside edge connector 300. In some embodiments, the bottomside edge connector 300 may be implemented at the edge connector 132 of the transceiver 100 of FIG. 1A. For example, the bottomside edge connector 300 may replace the bottomside edge connector 200 of FIG. 2A. In some embodiments, the bottomside edge connector 300 may be employed in conjunction with the topside edge connector 250 of FIG. 2B. Alternately, the bottomside edge connector 300 may be employed in conjunction with other topside edge connectors, such as the topside edge connectors described below.

The bottomside edge connector 300 may include a ground pin 301, a ground pin 304, a ground pin 307, and a ground pin 310, which may be described as ground pins and may be long pins. Thus, for example, the ground pin 301, the ground pin 304, the ground pin 307, and the ground pin 310 may exhibit first mate and last demate behavior when the transceiver is, respectively, inserted into and removed from a host device.

Additionally, the bottomside edge connector 300 may include a transmitter inverted data input pin 302 and a transmitter data input pin 303, which may accommodate a high-speed differential input data stream. The ground pin 301 and the ground pin 304 may border the transmitter inverted data input pin 302 and the transmitter data input pin 303, which may enhance the integrity of signals communicated via the transmitter inverted data input pin 302 and the transmitter data input pin 303. Thus, for example, the topside edge connector may accommodate another high-speed differential input data stream, such as is accommodated by the topside edge connector 250 of FIG. 2B, and the edge connector can accommodate two high-speed differential input data streams. An input data rate may be doubled relative to a conventional edge connector having one differential input data stream. Furthermore, the total input data rate may higher than an electrical interface signaling rate of a host device. For example, embodiments may facilitate a 50-Gbps input data rate with a host device having electrical interface signaling rate of 25 Gbps. Similarly, embodiments may facilitate a 100-Gbps input data rate with a host device having electrical interface signaling rate of 50 Gbps, or the like. The host connector of the host device may be configured to maintain signal integrity for high-speed signals at the bottomside of the connector.

The bottomside edge connector 300 may further include a receiver data output pin 308 and a receiver inverted data input pin 309, which may accommodate a high-speed differential output data stream. The ground pin 307 and the ground pin 310 may border the receiver data output pin 308 and the receiver inverted data input pin 309, which may enhance the integrity of signals communicated via the receiver data output pin 308 and the receiver inverted data input pin 309. Thus, for example, the topside edge connector may accommodate another high-speed differential output data stream, such as is accommodated by the topside edge connector 250 of FIG. 2B, and the edge connector can accommodate two high-speed differential output data streams. An output data rate may be doubled relative to a conventional edge connector having one differential output data stream. Furthermore, the total input data rate may higher than an electrical interface signaling rate of a host device. For example, embodiments may facilitate a 50-Gbps output data rate with a host device having electrical interface signaling rate of 25 Gbps. Similarly, embodiments may facilitate a 100-Gbps output data rate with a host device having electrical interface signaling rate of 50 Gbps, or the like. The host connector of the host device may be configured to maintain signal integrity for high-speed signals at the bottomside of the connector.

In some embodiments, the positions of the transmitter inverted data input pin 302 and the transmitter data input pin 303 may be reversed. Alternately or additionally, the positions of the receiver data output pin 308 and the receiver inverted data input pin 309 may be reversed. Alternately or additionally, the positions of the transmitter inverted data input pin 302 and the transmitter data input pin 303 may be swapped with the positions of the receiver data output pin 308 and the receiver inverted data input pin 309. The transmitter inverted data input pin 302 and the transmitter data input pin 303 may be described herein as high-speed differential input pins. The receiver data output pin 308 and the receiver inverted data input pin 309 may be described generally herein as high-speed differential output pins. The transmitter inverted data input pin 302, the transmitter data input pin 303, the receiver data output pin 308 and the receiver inverted data input pin 309 may be described herein generally as high-speed differential pins.

The bottomside edge connector 300 may include a serial interface data line pin 305 and a serial interface clock pin 306. The serial interface data line pin 305 and the serial interface clock pin 306 may form a 2-wire serial interface. In some embodiments, control and status functions, such as low-speed control and status communications may be performed through the 2-wire interface of the serial interface data line pin 305 and the serial interface clock pin 306. For example, control functions such as transmitter disabling, receive rate controls, and transmit rate controls may be performed via the 2-wire interface of the serial interface data line pin 305 and the serial interface clock pin 306. Additionally, status functions such as transmitter fault indications and module detection may be performed via the 2-wire interface of the serial interface data line pin 305 and the serial interface clock pin 306.

Thus, for example, the bottomside edge connector 300 may perform, via the 2-wire interface of the serial interface data line pin 305 and the serial interface clock pin 306, communications handled by other pins of the conventional edge connector. For example, the 2-wire interface of the serial interface data line pin 305 and the serial interface clock pin 306 may facilitate communication associated with low-speed control pins, such as the transmitter disable pin 203 of FIG. 2A, the receive rate speed control pin 207, the transmit rate speed control pin 209, or any combination thereof. Alternately or additionally, the 2-wire interface of the serial interface data line pin 305 and the serial interface clock pin 306 may facilitate communication associated with status pins, such as the transmitter fault pin 202 of FIG. 2A, the module detect pin 206, the loss of signal pin 208, or any combination thereof.

In some embodiments, control and status communication may be performed through the 2-wire interface of the serial interface data line pin 305 and the serial interface clock pin 306. Alternately or additionally, data stream squelch methods, out-of-band transmissions, or the like may be employed to convey control and status data. For example, control and status data, such as transmitter fault and loss of signal indicators, or transmitter disable signals, module detection signals, receive rate speed controls, transmit rate speed controls, or the like or any combination thereof may be communicated via a differential input data stream or a differential output data stream.

In some embodiments, the host device may employ alternate methods of determining when the transceiver has been inserted into a slot of the host device. Alternately or additionally, a host may be configured to test communicating with a transceiver inserted into a slot of the host device through both the fourth and fifth pin locations relative to the top (e.g., the serial interface data line pin 204 and the serial interface clock pin 205 of the bottomside edge connector 200 of FIG. 2A or the ground pin 304 and the serial interface data line pin 305 of the bottomside edge connector 300 of FIG. 3), as well as the fifth and sixth pin locations (e.g., the serial interface clock pin 205 and the module detect pin 206 of the bottomside edge connector 200 of FIG. 2A or the serial interface data line pin 305 and the serial interface clock pin 306 of the bottomside edge connector 300 of FIG. 3) such that the host may identify whether the inserted transceiver has a connector having the bottomside configuration of FIG. 2A (e.g., a conventional SFP+ connector) or the connector of FIG. 3. By way of example, a host device may successfully communicate with the connector of FIG. 2A, but not the connector of FIG. 3 via the fourth and fifth pins. Similarly the host device may successfully communicate with the connector of FIG. 3, but not the connector of FIG. 2A via the fifth and sixth pins.

The transmitter inverted data input pin 302, the transmitter data input pin 303, the serial interface data line pin 305, the serial interface clock pin 306, the receiver data output pin 308, and the receiver inverted data input pin 309 may be described as signal pins and may be short pins. Thus, for example, the transmitter inverted data input pin 302, the transmitter data input pin 303, the serial interface data line pin 305, the serial interface clock pin 306, the receiver data output pin 308, and the receiver inverted data input pin 309 may exhibit last mate and first demate behavior when the transceiver is, respectively, inserted into and removed from a host device.

Figure 4:
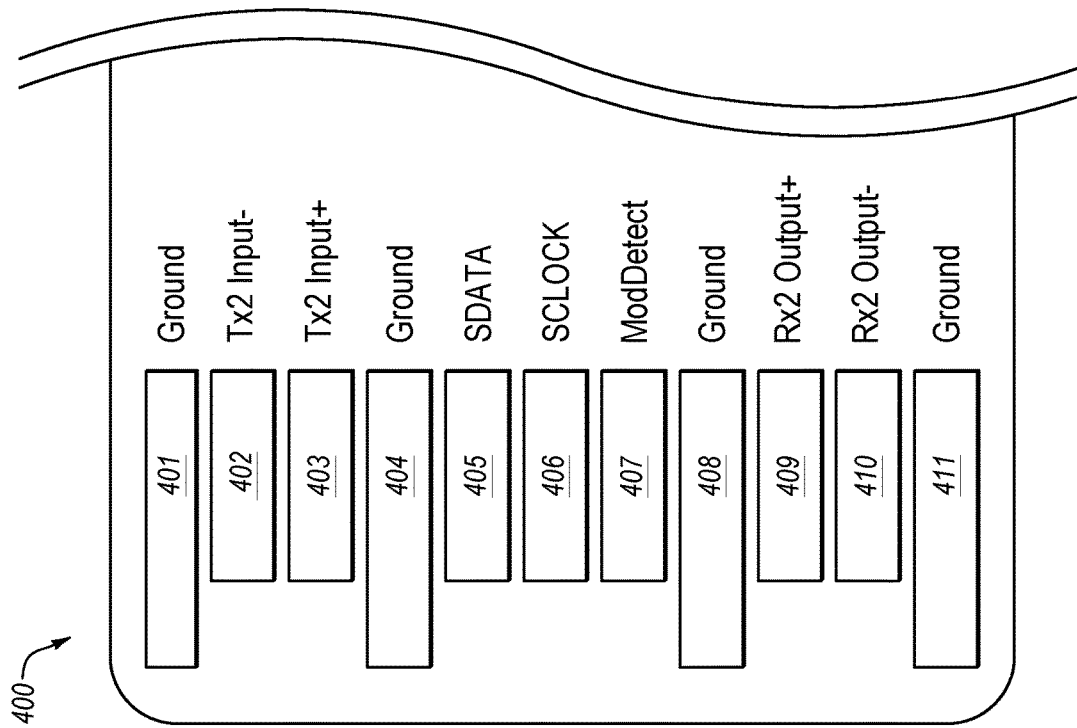
FIG. 4 illustrates still another example bottomside edge connector.

FIG. 4 illustrates still another example bottomside edge connector 400. In some embodiments, the bottomside edge connector 400 may be implemented at the edge connector 132 of the transceiver 100 of FIG. 1A. For example, the bottomside edge connector 400 may replace the bottomside edge connector 200 of FIG. 2A. In some embodiments, the bottomside edge connector 400 may be employed in conjunction with the topside edge connector 250 of FIG. 2B. Alternatively, the bottomside edge connector 400 may be employed in conjunction with other topside edge connectors, such as the topside edge connectors described below.

The bottomside edge connector 400 may introduce an 11th pin. With reference to FIG. 2A, conventional SFP+ pin locations are intentionally offset from a centerline of the edge connectors. Thus, for example, the bottomside edge connector 200 includes a relatively larger space between the ground pin 201 and the edge of the PCB. With reference again to FIG. 4, in some embodiments, a ground pin 401 may be included in this space alongside 10 other pins, which are described below. In some embodiments, the ground pin 401 may be narrower than the other pins to maintain a gap between the ground pin 401 and the PCB edge. Alternately, the ground pin 401 may have the same width as the other pins and the gap between the ground pin 401 and the PCB edge may be relatively narrower. Alternately, the pins may be resized to create a desired gap size and pin width.

The bottomside edge connector 400 may include a ground pin 401, a ground pin 404, a ground pin 408, and a ground pin 411, which may be described as ground pins and may be long pins. Thus, for example, the ground pin 401, the ground pin 404, the ground pin 408, and the ground pin 411 may exhibit first mate and last demate behavior when the transceiver is, respectively, inserted into and removed from a host device.

Additionally, the bottomside edge connector 400 may include a transmitter inverted data input pin 402 and a transmitter data input pin 403, which may accommodate a high-speed differential input data stream. The ground pin 401 and the ground pin 404 may border the transmitter inverted data input pin 402 and the transmitter data input pin 403, which may enhance the integrity of signals communicated via the transmitter inverted data input pin 402 and the transmitter data input pin 403. Thus, for example, the topside edge connector may accommodate another high-speed differential input data stream, such as is accommodated by the topside edge connector 250 of FIG. 2B, and the edge connector can accommodate two high-speed differential input data streams. An input data rate may be doubled relative to a conventional edge connector having one differential input data stream. Furthermore, the total input data rate may higher than an electrical interface signaling rate of a host device. For example, embodiments may facilitate a 50-Gbps input data rate with a host device having electrical interface signaling rate of 25 Gbps. Similarly, embodiments may facilitate a 100-Gbps input data rate with a host device having electrical interface signaling rate of 50 Gbps, or the like. The host connector of the host device may be configured to maintain signal integrity for high-speed signals at the bottomside of the connector.

The bottomside edge connector 400 may further include a receiver data output pin 409 and a receiver inverted data input pin 410, which may accommodate a high-speed differential output data stream. The ground pin 408 and the ground pin 411 may border the receiver data output pin 409 and the receiver inverted data input pin 410, which may enhance the integrity of signals communicated via the receiver data output pin 409 and the receiver inverted data input pin 410. Thus, for example, the topside edge connector may accommodate another high-speed differential output data stream, such as is accommodated by the topside edge connector 250 of FIG. 2B, and the edge connector can accommodate two high-speed differential output data streams. An output data rate may be doubled relative to a conventional edge connector having one differential output data stream. Furthermore, the total input data rate may higher than an electrical interface signaling rate of a host device. For example, embodiments may facilitate a 50-Gbps output data rate with a host device having electrical interface signaling rate of 25 Gbps. Similarly, embodiments may facilitate a 100-Gbps output data rate with a host device having electrical interface signaling rate of 50 Gbps, or the like. The host connector of the host device may be configured to maintain signal integrity for high-speed signals at the bottomside of the connector.

In some embodiments, the positions of the transmitter inverted data input pin 402 and the transmitter data input pin 403 may be reversed. Alternately or additionally, the positions of the receiver data output pin 409 and the receiver inverted data input pin 410 may be reversed. Alternately or additionally, the positions of the transmitter inverted data input pin 402 and the transmitter data input pin 403 may be swapped with the positions of the receiver data output pin 409 and the receiver inverted data input pin 410. The transmitter inverted data input pin 402 and the transmitter data input pin 403 may be described herein as high-speed differential input pins. The receiver data output pin 409 and the receiver inverted data input pin 410 may be described generally herein as high-speed differential output pins. The transmitter inverted data input pin 402, the transmitter data input pin 403, the receiver data output pin 409 and the receiver inverted data input pin 410 may be described herein generally as high-speed differential pins.

The bottomside edge connector 400 may include a serial interface data line pin 405 and a serial interface clock pin 406. The serial interface data line pin 405 and the serial interface clock pin 406 may form a 2-wire serial interface. In some embodiments, control and status functions, such as low-speed control and status communications may be performed through the 2-wire interface of the serial interface data line pin 405 and the serial interface clock pin 406. For example, control functions such as transmitter disabling, receive rate controls, and transmit rate controls may be performed via the 2-wire interface of the serial interface data line pin 405 and the serial interface clock pin 406. Additionally, status functions such as transmitter fault indications and module detection may be performed via the 2-wire interface of the serial interface data line pin 405 and the serial interface clock pin 406.

Thus, for example, the bottomside edge connector 400 may perform, via the 2-wire interface of the serial interface data line pin 405 and the serial interface clock pin 406, communications handled by other pins of the conventional edge connector. For example, the 2-wire interface of the serial interface data line pin 405 and the serial interface clock pin 406 may facilitate communication associated with low-speed control pins, such as the transmitter disable pin 203 of FIG. 2A, the receive rate speed control pin 207, the transmit rate speed control pin 209, or any combination thereof. Alternately or additionally, the 2-wire interface of the serial interface data line pin 405 and the serial interface clock pin 406 may facilitate communication associated with status pins, such as the transmitter fault pin 202 of FIG. 2A, the loss of signal pin 208, or any combination thereof.

In some embodiments, control and status communication may be performed through the 2-wire interface of the serial interface data line pin 405 and the serial interface clock pin 406. Alternately or additionally, data stream squelch methods, out-of-band transmissions, or the like may be employed to convey control and status data. For example, control and status data, such as transmitter fault and loss of signal indicators, or transmitter disable signals, receive rate speed controls, transmit rate speed controls, or the like or any combination thereof may be communicated via a differential input data stream or a differential output data stream.

The bottomside edge connector 400 may include a module detect pin 407. A host device may employ the module detect pin 407 to detect a transceiver including the bottomside edge connector 400.

The transmitter inverted data input pin 402, the transmitter data input pin 403, the serial interface data line pin 405, the serial interface clock pin 406, the module detect pin 407, the receiver data output pin 409, and the receiver inverted data input pin 410 may be described as signal pins and may be short pins. Thus, for example, the transmitter inverted data input pin 402, the transmitter data input pin 403, the serial interface data line pin 405, the serial interface clock pin 406, the module detect pin 407, the receiver data output pin 409, and the receiver inverted data input pin 410 may exhibit last mate and first demate behavior when the transceiver is, respectively, inserted into and removed from a host device.

Thus, for example, the serial interface data line pin 405, the serial interface clock pin 406, and the module detect pin 407 may be located in the same positions as the serial interface data line pin 204, the serial interface clock pin 205, and the module detect pin 206 of a conventional SFP+ connector. A host device may be configured to detect insertion of a transceiver having the bottomside edge connector 400 or a conventional SFP+ transceiver by communicating with the same set of pins. In some embodiments, after establishing communication with the installed transceiver and determining the type inserted, the host device may then activate the appropriate high-speed or low-speed interface for controlling the inserted transceiver.

Figure 5:
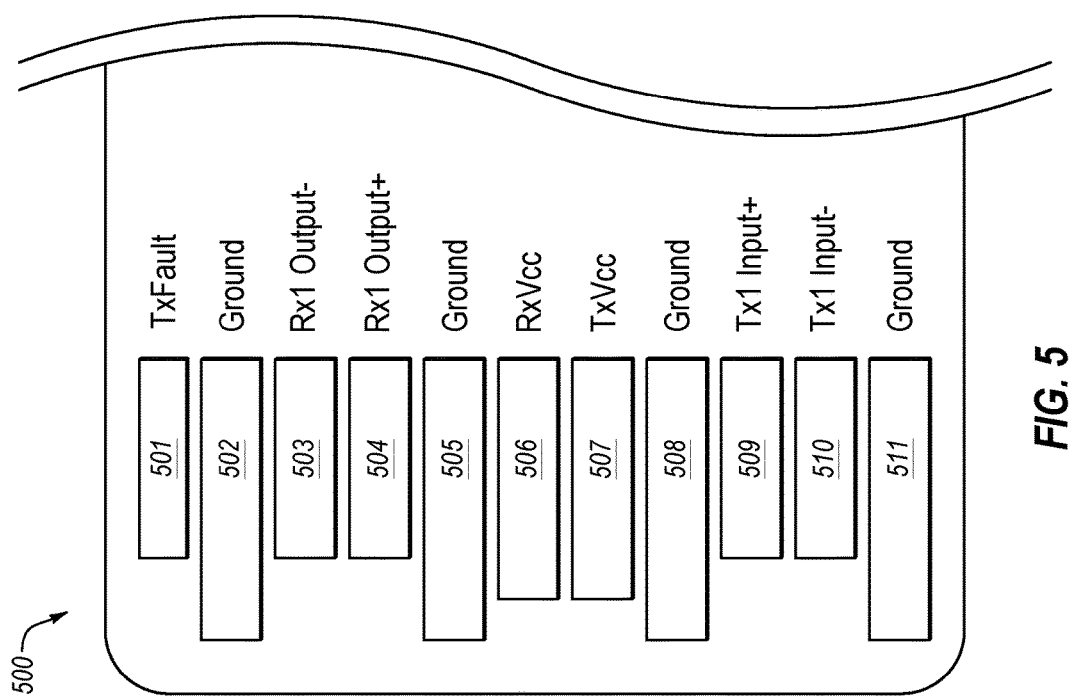
FIG. 5 illustrates another example topside edge connector.

FIG. 5 illustrates another topside edge connector 500. In some embodiments, the topside edge connector 500 may be implemented at the edge connector 132 of the transceiver 100 of FIG. 1A. For example, the topside edge connector 500 may replace the topside edge connector 250 of FIG. 2B. In some embodiments, the topside edge connector 500 may be employed in conjunction with the bottomside edge connector 300 of FIG. 3, the bottomside edge connector 400 of FIG. 4, or other bottomside edge connectors described herein.

The topside edge connector 500 may introduce an 11th pin. With reference to FIG. 2B, conventional SFP+ pin locations are intentionally offset from a centerline of the edge connectors. Thus, for example, the topside edge connector 250 includes a relatively larger space between the topside edge connector 250 and the edge of the PCB. With reference again to FIG. 5, in some embodiments, a low-speed interface pin, such as a transmitter fault pin 501 may be included in this space alongside 10 other pins, which are described below. In some embodiments, the transmitter fault pin 501 may be narrower than the other pins to maintain a gap between the transmitter fault pin 501 and the PCB edge. Alternately, the transmitter fault pin 501 may have the same width as the other pins and the gap between the transmitter fault pin 501 and the PCB edge may be relatively narrower. Alternately, the pins may be resized to create a desired gap size and pin width.

The transmitter fault pin 501 may provide a low-speed transmitter fault interface for signaling to a host device that there is a fault in the transceiver. Alternately or additionally, the transmitter fault pin 501 may provide another interface. For example, the transmitter fault pin 501 may provide a control or status interface that is not included on a counterpart bottomside connector, such as a transmitter disable interface, a receive rate speed control interface, a transmit rate speed control interface, a loss of signal interface, a module detect interface, or the like or any combination thereof.

The topside edge connector 500 may include a ground pin 502, a ground pin 505, a ground pin 508, and a ground pin 511, which may be described as ground pins and may be long pins. Thus, for example, the ground pin 502, the ground pin 505, the ground pin 508, and the ground pin 511 may exhibit first mate and last demate behavior when the transceiver is, respectively, inserted into and removed from a host device.

A receiver inverted data input pin 503 and a receiver data output pin 504 may be located between the ground pin 502 and the ground pin 505. The receiver inverted data input pin 503 and the receiver data output pin 504 may accommodate a high-speed differential output data stream. Additionally, the topside edge connector 500 may include a transmitter data input pin 509 and a transmitter inverted data input pin 510 located between the ground pin 508 and the ground pin 511. The transmitter data input pin 509 and the transmitter inverted data input pin 510 may accommodate a high-speed differential input data stream. The receiver inverted data input pin 503, the receiver data output pin 504, the transmitter data input pin 509, and the transmitter inverted data input pin 510 may be described herein as signal pins and may be short pins.

The topside edge connector 500 may further include a receiver power supply pin 506 and a transmitter power supply pin 507, which may provide power, respectively, to receiver circuitry and transmitter circuitry of an associated transceiver. The receiver power supply pin 506 and the transmitter power supply pin 507 may be described herein as power pins and may be intermediate-length pins.

In some embodiments, the positions of the receiver inverted data input pin 503 and the receiver data output pin 504 may be reversed. Alternately or additionally, the positions of the transmitter data input pin 509 and the transmitter inverted data input pin 510 may be reversed. Alternately or additionally, the positions of the receiver inverted data input pin 503 and the receiver data output pin 504 may be swapped with the positions of the transmitter data input pin 509 and transmitter inverted data input pin 510. The receiver inverted data input pin 503 and the receiver data output pin 504 may be described herein as high-speed differential output pins. The transmitter data input pin 509 and the transmitter inverted data input pin 510 may be described generally herein as high-speed differential input pins. The receiver inverted data input pin 503, the receiver data output pin 504, the transmitter data input pin 509, and the transmitter inverted data input pin 510 may be described herein generally as high-speed differential pins.

In some embodiments, a host device may be configured to include a 20-pin, a 21-pin, or a 22-pin host connector for facilitating a connection with the edge connectors. For example, the host device may be configured to include a 20-pin connector for transceivers including an edge connector having the bottomside edge connector 300 of FIG. 3 and the topside edge connector 250 of FIG. 2B. Alternately or additionally, the host device may be configured to include a 21-pin connector for transceivers including an edge connector having the bottomside edge connector 400 of FIG. 4 and the topside edge connector 250 of FIG. 2B, or the like. Alternately or additionally, the host device may be configured to include a 22-pin connector for transceivers including an edge connector having the bottomside edge connector 400 of FIG. 4 and the topside edge connector 500 of FIG. 5. In some embodiments, the host connector may be configured for high precision alignment with the transceiver edge connector, particularly in embodiments having a pin with a relatively narrow width, such as the ground pin 401 of FIG. 4, the transmitter fault pin 501 of FIG. 5, or the like.

All examples and conditional language recited herein are intended for pedagogical objects to aid the reader in understanding the embodiments and the concepts contributed to furthering the art, and are to be construed as being without limitation to such specifically recited examples and conditions. Although embodiments have been described in detail, it should be understood that the various changes, substitutions, and alterations could be made hereto without departing from the scope of the embodiments.

The invention claimed is:

1. A transceiver connector comprising:
a bottomside connector including:
   a first ground pin adjacent to an edge of the bottomside connector;
   a first high-speed differential input pin adjacent to the first ground pin;
   a second high-speed differential input pin adjacent to the first high-speed differential input pin;
   a second ground pin adjacent to the second high-speed differential input pin;
   a serial interface data line pin adjacent to the second ground pin;
   a serial interface clock pin adjacent to the serial interface data line pin;
   a third ground pin adjacent to the serial interface clock pin;
   a first high-speed differential output pin adjacent to the third ground pin;
   a second high-speed differential output pin adjacent to the first high-speed differential output pin; and
   a fourth ground pin adjacent to the second high-speed differential output pin.

2. The transceiver connector of claim 1, further comprising a topside connector including:
   a low-speed interface pin adjacent to an edge of the topside connector;
   a fifth ground pin adjacent to the low-speed interface pin;
   a third high-speed differential output pin adjacent to the fifth ground pin;
   a fourth high-speed differential output pin adjacent to the third high-speed differential output pin;
   a sixth ground pin adjacent to the fourth high-speed differential output pin;
   a receiver power pin adjacent to the sixth ground pin;
   a transmitter power pin adjacent to the receiver power pin;
   a seventh ground pin adjacent to the transmitter power pin;
   a third high-speed differential input pin adjacent to the seventh ground pin;
   a fourth high-speed differential input pin adjacent to the third high-speed differential input pin; and
   an eighth ground pin adjacent to the fourth high-speed differential input pin.

3. The transceiver connector of claim 2, wherein the low-speed interface pin comprises an interface for signaling that there is a fault in a transceiver associated with the transceiver connector.

4. The transceiver connector of claim 2, wherein the low-speed interface pin has a width narrower than a width of the fifth ground pin.

5. The transceiver connector of claim 1, wherein the serial interface data line pin and the serial interface clock pin comprises a 2-wire serial interface for communicating transmitter disable signals.

6. The transceiver connector of claim 1, wherein the serial interface data line pin and the serial interface clock pin comprises a 2-wire serial interface for communicating loss of signal signals.

7. A transceiver connector comprising:
a bottomside connector including:
   a first ground pin adjacent to an edge of the bottomside connector;
   a first high-speed differential input pin adjacent to the first ground pin;
   a second high-speed differential input pin adjacent to the first high-speed differential input pin;
   a second ground pin adjacent to the second high-speed differential input pin;
   a serial interface data line pin adjacent to the second ground pin;
   a serial interface clock pin adjacent to the serial interface data line pin;
   a transceiver module detection pin adjacent to the serial interface clock pin;
   a third ground pin adjacent to the transceiver module detection pin;
   a first high-speed differential output pin adjacent to the third ground pin;
   a second high-speed differential output pin adjacent to the first high-speed differential output pin; and
   a fourth ground pin adjacent to the second high-speed differential output pin.

8. The transceiver connector of claim 7, further comprising a topside connector including:
   a low-speed interface pin adjacent to an edge of the topside connector;
   a fifth ground pin adjacent to the low-speed interface pin;
   a third high-speed differential output pin adjacent to the fifth ground pin;
   a fourth high-speed differential output pin adjacent to the third high-speed differential output pin;
   a sixth ground pin adjacent to the fourth high-speed differential output pin;
   a receiver power pin adjacent to the sixth ground pin;
   a transmitter power pin adjacent to the receiver power pin;
   a seventh ground pin adjacent to the transmitter power pin;
   a third high-speed differential input pin adjacent to the seventh ground pin;
   a fourth high-speed differential input pin adjacent to the third high-speed differential input pin; and
   an eighth ground pin adjacent to the fourth high-speed differential input pin.

9. The transceiver connector of claim 8, wherein the low-speed interface pin comprises an interface for signaling that there is a fault in a transceiver associated with the transceiver connector.

10. The transceiver connector of claim 8, wherein the low-speed interface pin has a width narrower than a width of the fifth ground pin.

11. The transceiver connector of claim 7, wherein the serial interface data line pin and the serial interface clock pin comprises a 2-wire serial interface for communicating transmitter disable signals.

12. The transceiver connector of claim 7, wherein the serial interface data line pin and the serial interface clock pin comprises a 2-wire serial interface for communicating loss of signal signals.

13. The transceiver connector of claim 7, wherein the first ground pin has a width narrower than a width of the first high-speed differential input pin.

14. A transceiver connector comprising:
a topside connector including:
- a low-speed interface pin adjacent to an edge of the topside connector;
- a first ground pin adjacent to the low-speed interface pin;
- a first high-speed differential output pin adjacent to the first ground pin;
- a second high-speed differential output pin adjacent to the first high-speed differential output pin;
- a second ground pin adjacent to the second high-speed differential output pin;
- a receiver power pin adjacent to the second ground pin;
- a transmitter power pin adjacent to the receiver power pin;
- a third ground pin adjacent to the transmitter power pin;
- a first high-speed differential input pin adjacent to the third ground pin;
- a second high-speed differential input pin adjacent to the first high-speed differential input pin; and
- a fourth ground pin adjacent to the second high-speed differential input pin.

15. The transceiver connector of claim 14, wherein the low-speed interface pin comprises an interface for signaling that there is a fault in a transceiver associated with the transceiver connector.

16. The transceiver connector of claim 15, further comprising a bottomside connector including:
- a fifth ground pin adjacent to an edge of the bottomside connector;
- a third high-speed differential input pin adjacent to the fifth ground pin;
- a fourth high-speed differential input pin adjacent to the third high-speed differential input pin;
- a sixth ground pin adjacent to the fourth high-speed differential input pin;
- a serial interface data line pin adjacent to the sixth ground pin;
- a serial interface clock pin adjacent to the serial interface data line pin;
- a seventh ground pin adjacent to the serial interface clock pin;
- a third high-speed differential output pin adjacent to the seventh ground pin;
- a fourth high-speed differential output pin adjacent to the third high-speed differential output pin; and
- an eighth ground pin adjacent to the fourth high-speed differential output pin.

17. The transceiver connector of claim 16, wherein the low-speed interface pin and the fifth ground pin each have a width narrower than a width of the first ground pin.

18. The transceiver of claim 17, wherein the serial interface data line pin and the serial interface clock pin comprises a 2-wire serial interface for communicating transmitter disable signals and loss of signal signals.

19. The transceiver connector of claim 15, further comprising a bottomside connector including:
- a fifth ground pin adjacent to an edge of the bottomside connector;
- a third high-speed differential input pin adjacent to the fifth ground pin;
- a fourth high-speed differential input pin adjacent to the third high-speed differential input pin;
- a sixth ground pin adjacent to the fourth high-speed differential input pin;
- a serial interface data line pin adjacent to the sixth ground pin;
- a serial interface clock pin adjacent to the serial interface data line pin;
- a transceiver module detection pin adjacent to the serial interface clock pin;
- a seventh ground pin adjacent to the transceiver module detection pin;
- a third high-speed differential output pin adjacent to the seventh ground pin;
- a fourth high-speed differential output pin adjacent to the third high-speed differential output pin; and
- an eighth ground pin adjacent to the fourth high-speed differential output pin.

20. The transceiver connector of claim 19, wherein the low-speed interface pin and the fifth ground pin each have a width narrower than a width of the first ground pin.

* * * * *